E. C. WOODWARD.
APPARATUS FOR SEALING PIPE JOINTS.
APPLICATION FILED JAN. 5, 1917.
1,240,288.
Patented Sept. 18, 1917.
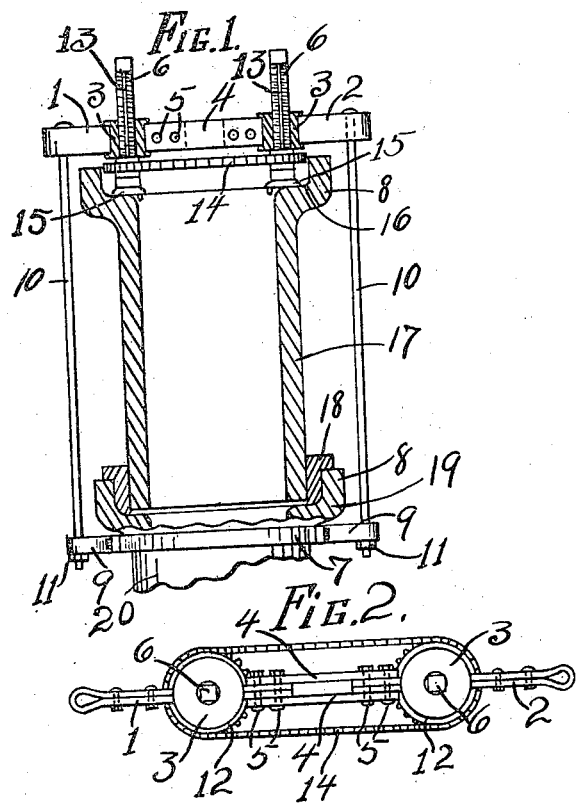
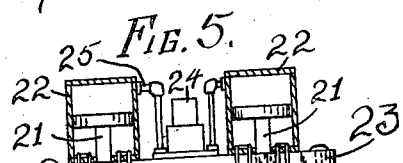
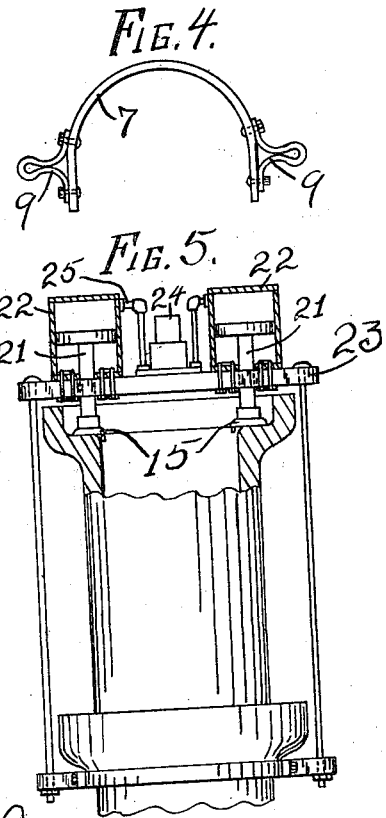
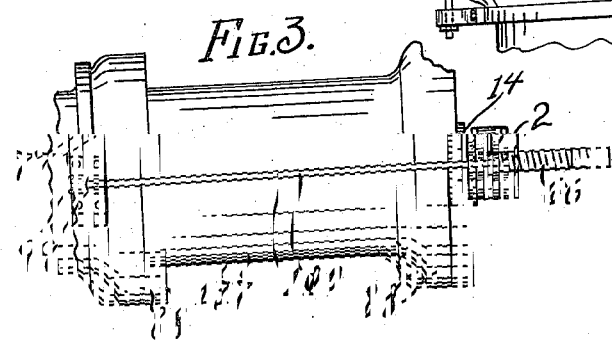

UNITED STATES PATENT OFFICE.

EDWIN C. WOODWARD, OF DALLAS, TEXAS, ASSIGNOR TO E. P. WOODWARD, OF DALLAS, TEXAS, AND E. R. WOODWARD, OF FORT WORTH, TEXAS.

APPARATUS FOR SEALING PIPE-JOINTS.

1,240,288.      Specification of Letters Patent.      Patented Sept. 18, 1917.

Application filed January 5, 1917. Serial No. 140,357.

*To all whom it may concern:*

Be it known that I, EDWIN C. WOODWARD, a citizen of the United States, residing at Dallas, in the county of Dallas and State of Texas, have invented certain new and useful Improvements in Apparatus for Sealing Pipe-Joints, of which the following is a specification.

My invention relates to devices for effecting permanent sealing of sewer pipes, water mains and the like and more particularly to devices for forcing the pipes into position; and the object is to provide simple and powerful devices which can be easily and readily operated to force pipes into position with sufficient pressure to form a sealing gasket in the joint for the purpose of making a permanent and efficient sealing of the joint. Gaskets are provided which are capable of being pressed into the desired form or position relative to the meeting faces or edges of the two pipes and the object of this invention is to provide a ready means of forming the gaskets between the meeting of the two pipes. Other objects and advantages will be fully explained in the following description and the invention will be more particularly pointed out in the claims.

Reference is had to the accompanying drawings which form a part of this application.

Figure 1 is a plan view of the apparatus, showing the application to pipe sections which are shown partly in section. Fig. 2 is an elevation of the apparatus. Fig. 3 is a side elevation of the apparatus as applied to the pipe sections. Fig. 4 is a detail view of the yoke used in connection with the forcing mechanism. Fig. 5 is a plan view of the apparatus, showing a variation in the power for driving or forcing the plungers.

Similar characters of reference are used to indicate the same parts throughout the several views.

The apparatus includes a frame composed of clamps 1 and 2 which engage and hold rigidly bearings 3 and of bars 4 which are bolted to the clamps 1 and 2 to hold these clamps at fixed distances apart. The bars 4 are bolted to the clamps 1 and 2 by bolts 5 and for different sizes of pipe sections, bars 4 of different lengths are to be used. The bearings 3 have interior threads and screw shafts 6 move through the bearings 3. A yoke is provided for engaging the pipe section behind the shoulder formed by the bell 8 of the pipe section. Brackets 9 are attached to the yokes 7 to receive the stay rods 10. The stay rods 10 are caught in the clamps 1 and 2 and held in position by nuts 11. Thus the frame, including the bars 4 and clamps 1 and 2, is made stationary with and held in fixed relation to the pipe section which has already been laid.

Means are provided for making both the screw shafts 6 turn uniformly together. Sprocket wheels 12 are mounted on the screw shafts 6 and held in fixed relation thereto against turning thereon and made to turn therewith by tongues or keys which project into key seats 13 in the shafts 6. The shafts 6 can move axially through the sprocket wheels 12. A sprocket chain 14 is mounted on the wheels 12 so that when one of the shafts 6 is turned, the other shaft will be turned. Either one of the shafts 6 can be turned by any suitable crank or other means. Bearings 15 are mounted on the inner ends of the shafts 6 by swivel connections and these bearings engage the annular interior shoulder 16 of the pipe section which is to be set or placed in position, or the bearings may engage the end of the pipe section. By the means thus described, the pipe section 17 will be forced into position against the gasket 18 and the section 17 will force the gasket to conform to the interior of the bell 19 and the end of section 17, making a perfect seal which becomes permanent in the joint of the two sections. During this operation, the rods 10 will hold the frame and bearings 13 stationary with the pipe section 20 which has been previously set.

The variation shown in Fig. 5 provides for hydraulic pressure instead of the screw shafts and the sprocket wheels for driving the bearings 15. The pistons 21 of the cylinders 22 have connection with the bearings 15 and the cylinders 22 are attached to a frame 23. Oil or other fluid is pumped into the cylinders 22 by a pump 24 through pipes 25.

Should there be no shoulders on the sections of pipe, but merely straight pipe sections, the yoke 7 may be clamped on the pipe in any suitable manner. Various changes in the sizes, proportions and construction of the several parts may be made without departing from the scope of the appended claims.

What I claim is:—

1. An apparatus for sealing pipe couplings comprising a frame, screw bearings in said frame, a yoke adapted to be mounted on the previously laid section of pipe for holding said frame stationary with the section of pipe already laid, screw plungers operating through said bearings and provided with swivel bearings to engage the inner shoulder of the section of pipe to be sealed against the previously laid section, and means for driving said screw plungers.

2. An apparatus for sealing pipe couplings comprising a frame, a yoke engaging the section of pipe previously laid, rods adjustably connecting said frame to said yoke for holding said frame stationary, bearings in said frame, a pair of plungers operating through said bearings and provided with bearings for engaging the inner annular shoulder of the pipe section to be laid, and means for driving both of said plungers simultaneously.

3. An apparatus for sealing pipe couplings comprising a frame, means for holding said frame stationary with the section of pipe previously laid, interiorly screw threaded bearings rigid in said frame, screw plungers operating through said bearings and provided with swivel bearings for engaging the annular interior shoulder of the pipe section to be laid, sprocket wheels mounted on said screw shafts, and a sprocket chain mounted on said wheels for causing both shafts to turn simultaneously, said screw shafts being axially movable through said sprocket wheels.

4. An apparatus for sealing pipe couplings comprising a pair of clamps, bars for holding said clamps at fixed distances apart, said clamps and bars constituting a rigid frame, means for holding said frame rigid with the section of pipe previously laid, bearings rigidly held in said clamps, plungers operating through said bearings and provided with driving bearings for engaging the annular interior shoulder of the pipe section to be laid, and means for driving said plungers simultaneously through said bearings in said clamps for causing said driving bearings to move the section of pipe to be laid.

In testimony whereof, I set my hand, this 25th day of December, 1916.

EDWIN C. WOODWARD.

Copies of this patent may be obtained for five cents each, by addressing the "Commissioner of Patents, Washington, D. C."